US006853745B1

(12) United States Patent
Jacobs et al.

(10) Patent No.: US 6,853,745 B1
(45) Date of Patent: Feb. 8, 2005

(54) LAMBERTIAN REFLECTANCE AND LINEAR SUBSPACES

(75) Inventors: David W. Jacobs, Princeton, NJ (US); Ronen Basri, Rehovot (IL)

(73) Assignee: NEC Laboratories America, Inc., Princeton, NJ (US)

( * ) Notice: Subject to any disclaimer, the term of this patent is extended or adjusted under 35 U.S.C. 154(b) by 768 days.

(21) Appl. No.: 09/705,507

(22) Filed: Nov. 3, 2000

(51) Int. Cl.[7] .............................. G06K 9/00; G06K 9/46; G06K 9/62

(52) U.S. Cl. ........................ 382/154; 382/118; 382/190; 382/224

(58) Field of Search ................................ 382/115, 116, 382/117, 118, 119, 124, 153, 154, 156, 159, 165, 181, 190, 209, 216, 224

(56) References Cited

U.S. PATENT DOCUMENTS

| 5,710,833 | A | * | 1/1998 | Moghaddam et al. | ....... 382/228 |
| 5,724,447 | A | * | 3/1998 | Fukushima | ................ 382/211 |
| 6,009,437 | A | * | 12/1999 | Jacobs | ....................... 707/102 |
| 6,137,896 | A | * | 10/2000 | Chang et al. | ............... 382/118 |
| 6,292,575 | B1 | * | 9/2001 | Bortolussi et al. | ......... 382/118 |
| 6,466,685 | B1 | * | 10/2002 | Fukui et al. | ............... 382/115 |
| 6,501,857 | B1 | * | 12/2002 | Gotsman et al. | ........... 382/224 |
| 6,621,929 | B1 | * | 9/2003 | Lai et al. | .................... 382/217 |

FOREIGN PATENT DOCUMENTS

| EP | 1143 375 | 10/2001 | |
| WO | WO 00/33240 A | * 6/2000 | ........... G06K/9/00 |

OTHER PUBLICATIONS

Belhumeur et al. "Eigenfaces vs. Fisherfaces: Recognition using class specific linear projection." Pattern Analysis and Machine Intelligence, IEEE Transactions on, vol.: 19, Issue: 7, Jul. 1997. pp 711–720.*

Nayar et al. "Dimensionally of illumination in appearance matching." Robotics and Automation, 1996. Proceedings., 1996 IEEE International Conference on, vol.: 2, Apr. 22–28, 1996. pp 1326–1332.*

Erturk et al. "3D model representation using spherical harmonics." Electronics Letters, vol.: 33, Issue: 11, May 22, 1997. pp 951–952.*

Adini et al. "Face recognition: the problem of compensating for changes in illlumination direction." Pattern Analysis and Machine Intelligence, IEEE Transactions on, vol.: 19, Issue: 7, Jul. 1997. pp 721–732.*

(List continued on next page.)

Primary Examiner—Jingge Wu
Assistant Examiner—Ryan J. Hesseltine

(57) ABSTRACT

A method for choosing an image from a plurality of three-dimensional models which is most similar to an input image is provided. The method includes the steps of: (a) providing a database of the plurality of three-dimensional models; (b) providing an input image; (c) positioning each three-dimensional model relative to the input image; (d) for each three-dimensional model, determining a rendered image that is most similar to the input image by: (d)(i) computing a linear subspace that describes an approximation to the set of all possible rendered images that each three-dimensional model can produce under all possible lighting conditions where each point in the linear subspace represents a possible image; and one of (d)(ii) finding the point on the linear subspace that is closest to the input image or finding a rendered image in a subset of the linear subspace obtained by projecting the set of images that are generated by positive lights onto the linear subspace; (e) computing a measure of similarly between the input image and each rendered image; and (f) selecting the three-dimensional model corresponding to the rendered image whose measure of similarity is most similar to the input image. Step (d) is preferably repeated for each of a red, green, and blue color component for each three-dimensional model. The linear subspace is preferably either four-dimensional or nine-dimensional.

6 Claims, 4 Drawing Sheets

OTHER PUBLICATIONS

Hager et al. "Efficient region tracking with parametric models of geometry and illumination." Pattern Analysis and Machine Intelligence, IEEE Transactions on, vol.: 20, Issue: 10, Oct. 1998. pp 1025–1039.*

Jacobs et al. "Comparing images under variable illumination." Computer Vision and Pattern Recognition, 1998. Proceedings. 1998 IEEE Computer Society Conference on, Jun. 23–25, 1998. pp 610–617.*

Chen et al. "In search of illumination invariants," Computer Vision and Pattern Recognition, 2000. Proceedings. IEEE Conference on, vol.: 1, Jun. 13–15, 2000. pp 254–261.*

P.N. Belhumeur et al., "What is the Set of Images of an Object Under All Possible Lighting Conditions?", Proceedings of the Computer Vision and Pattern Recognition Conference, pp. 270–277, 1996.

P.N. Belhumeur et al., "The Bas–Relief Ambiguity", International Journal of Computer Vision, vol. 35, No. 1, pp 33–44, 1999.

B. Cabral et al., "Bidirectional Reflection Functions from Surface Bump Maps", Computer Graphics, vol. 21, No. 4, pp. 273–281, 1987.

T.F. Cootes et al., "Training Models of Shape from Sets of Examples", Proceedings of the British Machine Vision Conference, pp. 9–18, 1992.

M. D'Zmura, "Shading Ambiguity: Reflectance and Illumination", Computational Models of Visual Processing, Landy, M. and Movshon, J. (eds.), pp. 187–207, 1991.

A.S. Georghiades et al., "Illumination Cones for Recognition Under Variable Lighting: Faces", Proceedings of the Computer Vision and Pattern Recognition Conference, pp. 52–58, 1998.

A.S. Georghiades et al., "From Few to Many: Generative Models for Recognition Under Variable Pose and Illumination", Proceedings of the International Conference on Automatic Face and Gesture Recognition, pp. 277–284, 2000.

H. Groemer, Geometric Applications of Fourier Series and Spherical Harmonics, Cambridge University Press, 1996 pp 97–118.

G.H. Golub et al., Matrix Computations, John Hopkins University Press, 1989 pp. 466–474.

P.W. Hallinan, "A Low–Dimensional Representation of Human Faces For Arbitrary Lighting Conditions", Proceedings of the Computer Vision and Pattern Recognition Conference, pp. 995–999, 1994.

H. Hayakawa, "Photometric stereo under a light source with arbitrary motion", Journal of the Optical Society of America, vol. 11, No. 11, pp. 3079–3089, 1994.

B.K.P. Horn, Robot Vision, MIT Press, 1986 pp. 202–277.

D.W. Jacobs et al., "Comparing Images Under Variable Illumination", NECI TR#97–183, 1997.

M. Kirby et al., "Application of the Karhunen–Loève Procedure for the Characterization of Human Faces", IEEE Transactions on Pattern Analysis and Machine Intelligence, vol. 12, No. 1, pp. 103–108, 1990.

J.J. Koenderink et al., "Bidirectional Reflection Distribution Function expressed in terms of surface scattering modes", Proceedings of the 4th European Conference on Computer Vision, vol. 2, pp. 28–39, 1996.

J. J. Koenderink et al., "The Generic Bilinear Calibration–Estimation Problem", International Journal of Computer Vision, vol. 23, No. 3, pp. 217–234, 1997.

Y. Moses, Face Recognition: Generalization to Novel Images, Ph.D. Thesis, Wiezmann Institute of Science, Israel, 1993.

H. Murase et al., "Visual Learning and Recognition of 3–D Objects from Appearance", International Journal of Computer Vision, vol. 14, No. 1, pp. 5–24, 1995.

A. Shashua, "On Photometric Issues in 3D Visual Recognition from a Single 2D Image", International Journal of Computer Vision, vol. 21, No. 1/2, pp. 99–122, 1997.

K.E. Torrance et al., "Theory for Off–Specular Reflection From Roughened Surfaces", Journal of the Optical Society of America, vol. 57, No. 9, pp. 1105–1114, 1967.

M. Turk et al., "Eigenfaces for Recognition", Journal of Cognitive Neuroscience, vol. 3, No. 1, pp. 71–86, 1991.

S. Ullman et al., "Recognition by Linear Combinations of Models", IEEE Transactions on Pattern Analysis and Machine Intelligence, vol. 13, No. 10, pp. 992–1006, 1991.

S.H. Westin et al., "Predicting Reflectance Functions from Complex Surfaces", Computer Graphics, vol. 26, No. 2, pp. 255–264, 1992.

A.L. Yuille et al., "Determining Generative Models of Objects Under Varying Illumination: Shape and Albedo from Multiple Images Using SVD and Integrability", International Journal of Computer Vision, vol. 35, No. 3, pp. 203–222, 1999.

* cited by examiner ns systems.

LAMBERTIAN REFLECTANCE AND LINEAR SUBSPACES

BACKGROUND OF THE INVENTION

1. Field of the Invention

The present invention relates generally to computer vision and, more particularly, to image recognition and model reconstructions systems.

2. Prior Art

One of the most basic problems in vision is to understand how variability in lighting affects the images that an object can produce. Even when lights are isotropic and relatively far from an object, it has been shown that smooth Lambertian objects can produce infinite-dimensional sets of images. It has been very popular in object recognition to represent the set of images that an object can produce using low dimensional linear subspaces of the space of all images. There are those in the art who have analytically derived such a representation for sets of 3D points undergoing scaled orthographic projection. Still others have derived a 3D linear representation of the set of images produced by a Lambertian object as lighting changes, though this simplified representation assigns negative intensities in places where the surface normals are facing away from the light. Others have used factorization to build 3D models using this linear representation. Yet still others have extended this to a 4D space by allowing for a diffuse component to lighting. These analytically derived representations have been restricted to fairly simple settings; for more complex sources of variation researchers have collected large sets of images and performed Principal Component Analysis (PCA) to build representations that capture within class variations and variations in pose and lighting. PCA is a numerical technique that finds the linear subspace that best represents a data set. Given a large set of images, PCA finds the low-dimensional linear subspace that fits them most closely. Experiments have been performed by those in the art that show that large numbers of images of real objects, taken with varied lighting conditions, do lie near a low-dimensional linear space, justifying this representation. More recently, non-linear representations have been used which point out that when lighting is restricted to be positive, an object's images occupy a convex volume. A. Georghiades et al., "Illumination Cones for Recognition Under Variable. Lighting: Faces", CVPR 98: 52–59, 1998 and A. Georghiades et al., "From Few to Many: Generative Models for Recognition Under Variable Pose and Illumination", Int. Conf. on Automatic Face and Gesture Recognition 2000, 2000 (collectively referred to as "Georghides") uses this representation for object recognition.

Spherical harmonics has been used in the graphics literature to efficiently represent the bi-directional reflection function (BRDF) of different materials. It has been proposed to replace the spherical harmonics basis with a different basis that is more suitable for a half sphere. M. D'Zmoura, 1991. "Shading Ambiguity: Reflectance and Illumination," in Computational Models of Visual Processing, edited by M. Landy, and. J. Movshon (hereinafter "D'Zmoura") pointed out that the process of turning incoming light into reflection can be described in terms of spherical harmonics. With this representation, after truncating high order components, the reflection process can be written as a linear transformation, and so the low order components of the lighting can be recovered by inverting the linear transformation. D'Zmoura used this analysis to explore ambiguities in lighting. The present invention extends the work of D'Zmoura by deriving subspace results for the reflectance function, providing analytic descriptions of the basis images, and constructing new recognition algorithms that use this analysis while enforcing non-negative lighting. Georghiades and D'Zmoura are incorporated herein by their reference.

In view of the prior art, there is a need for a computer vision system which shows how to analytically find low dimensional linear subspaces that accurately approximate the set of images that an object can produce from which portions of these subspaces can be carved out corresponding to positive lighting conditions. These descriptions can then be used for both recognition and model-building.

SUMMARY OF THE INVENTION

Therefore it is an object of the present invention to provide a method for choosing an image from a plurality of three-dimensional models which is most similar to an input image which overcomes the disadvantages of the prior art methods.

It is a further object of the present invention to provide a method for choosing an image from a plurality of three-dimensional models which is most similar to an input image which can be performed more efficiently and more rapidly than the methods of the prior art.

It is yet a further object of the present invention to provide a method for choosing an image from a plurality of three-dimensional models which is most similar to an input image which can be performed without complex iterative optimization techniques.

Variations in lighting can have a significant impact on the appearance of an object. The present invention provides a novel characterization of this variability for the case of Lambertian objects. A Lambertian object is one having a surface which reflects light according to Lambert's law, see J. Lambert. "Photometria Sive de Mensura et Gradibus Luminus, Colorum et Umbrae", Eberhard Klett, 1760. First, lighting is represented using spherical harmonics, the effects of Lambertian materials is described as the analog of a convolution; this is similar to working in the frequency domain in signal processing. It is then possible to show that almost all the appearance of Lambertian objects is determined by the first nine components of the lighting when represented as spherical harmonics. All reflectance functions (the mapping from surface normal to intensity) produced by Lambertian objects can be proved to lie close to a 9D linear subspace, explaining prior empirical results. The present invention also provides a simple analytic characterization of the linear space of images an object can produce. This can be readily used in object recognition algorithms based on linear methods, or that enforce non-negative lighting functions using convex optimization. In the case where a 4D linear approximation of an object's images is sufficient, the present invention shows that non-negative lighting can be enforced very simply.

The present invention analyzes the set of reflectance functions produced under Lambert's model for arbitrary configurations of lights. It is shown that such reflectance functions are produced through the analog of a convolution of the light with a kernel that acts essentially as a low pass filter. The present invention uses this and the non-negativity of light to prove analytically that under common lighting conditions, a nine-dimensional linear subspace, for example, accounts for 99.2% of the variability in the reflectance function. In the worst case this 9D space accounts for 98% of the variability. This suggests that in general the set of images of a convex, Lambertian object can be approximated accurately by a low dimensional linear space. The present invention further shows how to analytically derive this subspace for an object model. This result sheds new light on existing recognition algorithms and leads to a number of new, efficient algorithms for recognition and model construction under varying light and pose.

Accordingly, a method for choosing an image from a plurality of three-dimensional models which is most similar to an input image is provided. The method comprises the steps of: (a) providing a database of the plurality of three-dimensional models; (b) providing an input image; (c) positioning each three-dimensional model relative to the input image; (d) for each three-dimensional model, determining a rendered image that is most similar to the input image by: (d)(i) computing a linear subspace that describes an approximation to the set of all possible rendered images that each three-dimensional model can produce under all possible lighting conditions where each point in the linear subspace represents a possible image; and one of (d)(ii) finding the point on the linear subspace that is closest to the input image or finding a rendered image in a subset of the linear subspace obtained by projecting the set of images that are generated by positive lights onto the linear subspace; (e) computing a measure of similarly between the input image and each rendered image; and (f) selecting the three-dimensional model corresponding to the rendered image whose measure of similarity is most similar to the input image. Step (d) is preferably repeated for each of a red, green, and blue color component for each three-dimensional model. The linear subspace is preferably either four-dimensional or nine-dimensional.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Figure 1:
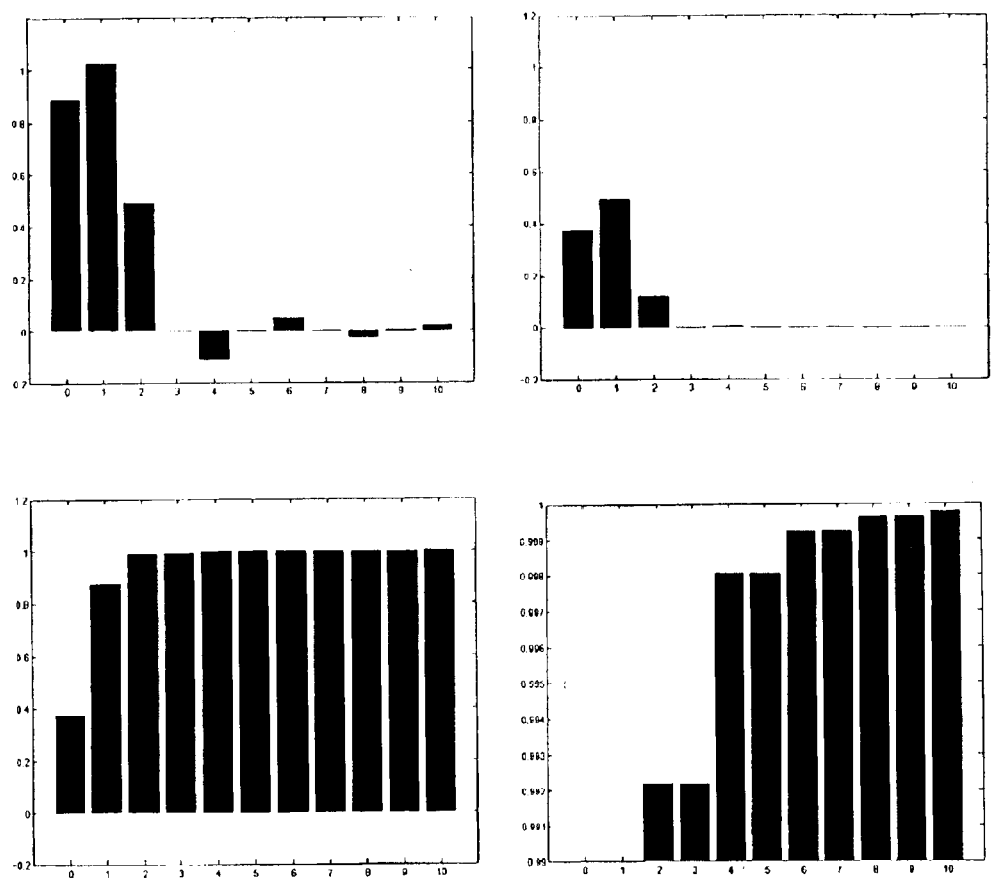
FIG. 1 illustrates a graph representation of the coefficients of Equation (9).

When light is isotropic and distant from an object, it can be characterized by describing intensity as a function of direction. The set of all possible lighting conditions, then, is equivalent to the set of all functions that are everywhere positive on the surface of a sphere. The approach of the present invention begins by adopting a representation of these functions using surface spherical harmonics. This is analogous to Fourier analysis, but on the surface of the sphere. Spherical harmonics describe functions contained in the unit sphere, surface harmonics are restrictions of these functions to the sphere's surface. To model the way surfaces turn light into an image the present invention looks at reflectance as a function of the surface normal (assuming unit albedo). The present invention shows that reflectance functions are produced through the analog of a convolution of the lighting function with a kernel that represents Lambert's reflection. D'Zmoura used such an analysis to detect ambiguities in the appearance of objects due to lighting variations. A bit of complexity is added to this simple view to describe what happens with objects made of non-constant materials, and to handle non-Lambertian reflectance functions.

With this view, it can be shown that a Lambertian kernel is a low-pass filter, and that this filter can be described analytically. Therefore, it can be shown analytically that for many common lighting conditions, much of the variation in appearance of an object depends on the first four components of the harmonic transform of the lighting function and almost all the variation is accounted for by the first nine components. In fact, the quality of the approximation deteriorates very little even when the light includes significant high frequency patterns. Lower bounds on the quality of the approximation under any lighting function are derived. This provides an understanding from first principles of the empirical observation that most images of an object lie near a low-dimensional linear subspace. Moreover, this linear subspace can be derived analytically from a model, while past efforts relied on performing PCA on a large set of rendered images.

This analytic understanding of how to linearly approximate lighting variations forms the core of a number of results. First, it allows better evaluation of the utility of several existing recognition and model construction methods. For example, it can be shown that the linear subspace method of the prior art in fact are based on using a linear space spanned by the three first order harmonics, but that it omits the significant DC component. Secondly, it leads to new methods of recognizing objects with unknown pose and lighting conditions. In particular, an algorithm for recognition under varying pose and illumination is presented that works in an analytically derived low-dimensional space. Finally, for cases in which a 4D linear subspace provides an adequate approximation, recognition can be performed very efficiently, without complex, iterative optimization techniques.

Modeling Image Formation

Consider a convex object illuminated by distant isotropic light sources. Assume further that the surface of the object reflects light according to Lambert's law. This relatively simple model has been analyzed and used effectively in a number of vision applications. This analysis can be extended to non-Lambertian objects. The set of images of a Lambertian object obtained with arbitrary light has been termed "the illumination cone" by some in the art. The objective of the present invention is to analyze properties of the illumination cone. For the analysis it will be useful to consider the set of reflectance functions obtained under different illumination conditions. A reflectance function (also called a reflectance map Horn) associated with a specific lighting configuration is defined as the light reflected by a sphere of unit albedo as a function of the surface normal. A reflectance function is related to an image of a convex object illuminated by the same lighting configuration by the following mapping. Every visible point on the object's surface inherits its intensity from the point on the sphere with the same normal, and this intensity is further scaled by the albedo at the point. The effect of this mapping is discussed below.

Image Formation as the Analog of a Convolution

Let S denote a unit sphere centered at the origin. Let $p=(x, y, z)$ denote a point on the surface of S, and let $N_p=(x, y, z)$ denote the surface normal at p. p can also be expressed as a unit vector using the following notation:

$$(x, y, z) = (\sin\theta\cos\phi, \sin\theta\sin\phi, \cos\phi), \qquad (1)$$

where $0 \leq \theta \leq \pi$ or and $0 \leq \phi \leq 2\pi$. In this coordinate frame the poles are set at $(0, 0, \pm 1)$, $\theta$ denotes the solid angle between p and $(0, 0, 1)$, and it varies with latitude, and $\phi$ varies with longitude. Since it is assumed that the sphere is illuminated by a distant and isotropic set of lights all points on the sphere see these lights coming from the same directions, and they are illuminated by identical lighting conditions. Consequently, the configuration of lights, that illuminate the sphere can be expressed as a non-negative function $l(\theta, \phi)$, expressing the intensity of the light reaching the sphere from each direction $(\theta, \phi)$. Furthermore, according to Lambert's law the difference in the light reflected by the points is entirely due to the difference in their surface normals. Thus, the light reflected by the sphere can be expressed as a function $r(\theta, \phi)$ whose domain is the set of surface normals of the sphere.

According to Lambert's law, if a light ray of intensity l reaches a surface point with albedo $\lambda$ forming an angle $\theta$ with the surface normal at the point, then the intensity reflected by the point due to this light is given by $$l\lambda \max(\cos\theta, 0) \quad (2)$$

Here it is assumed without loss of generality (WLOG) that $\lambda=1$. If light reaches a point from a multitude of directions then the light reflected by the point would be the sum of (or in the continuous case the integral over) the contribution for each direction. Denote by $k(\theta)=\max(\cos\theta, 0)$, then, for example, the intensity of the point $(0, 0, 1)$ is given by:

$$r(0, 0) = \int_0^{2\pi} \int_0^\pi k(\theta) l(\theta, \phi) \sin\theta\, d\theta\, d\phi. \quad (3)$$

Similarly, the intensity $r(\theta, \phi)$ reflected by a point $p=(\theta, \phi)$ is obtained by centering k about p and integrating its inner product with l over the sphere. Thus, the operation that produces $r(\theta, \phi)$ is the analog of a convolution on the sphere. This is referred to as a convolution, and thus:

$$r(\theta, \phi) = k * l. \quad (4)$$

The kernel of this convolution, k, is the circularly symmetric, half-cosine function. The convolution is obtained by rotating k so that its center is aligned with the surface normal at p. This still leaves one degree of freedom in the rotation of the kernel undefined, but since k is rotationally symmetric this ambiguity disappears.

Properties of the Convolution Kernel

Just as the Fourier basis is convenient for examining the results of convolutions in the plane, similar tools exist for understanding the results of the analog of convolutions on the sphere. The surface spherical harmonics are a set of functions that form an orthonormal basis for the set of all functions on the surface of the sphere. These functions are denoted by $h_{nm}$, with $n=0, 1, 2, \ldots$ and $-n \leq m \leq n$:

$$h_{nm}(\theta, \phi) = \sqrt{\frac{(2n+1)}{4\pi} \frac{(n-m)!}{(n+m)!}} P_{nm}(\cos\theta) e^{im\phi}, \quad (5)$$

where $P_{nm}$ are the associated Legendre functions, defined as $$P_{nm}(z) = \frac{(1-z^2)^{m/2}}{2^n n!} \frac{d^{n+m}}{dz^{n+m}}(z^2 - 1)^n. \quad (6)$$

The kernel, k, and the lighting function, l, are expressed as harmonic series, that is, as linear combinations of the surface harmonics. This is done primarily so that advantage can be taken of the analog to the convolution theorem for surface harmonics. An immediate consequence of the Funk-Hecke theorem (see, e.g., H. Groemer, Geometric applications of Fourier series and spherical harmonics, Cambridge University Press.) is that "convolution" in the function domain is equivalent to multiplication in the harmonic domain. As discussed below, a representation of k is derived as a harmonic series. This derivation is used to show that k is nearly a low-pass filter. Specifically, almost all of the energy of k resides in the first few harmonics. This will allow us to show that the possible reflectances of a sphere all lie near a low dimensional linear subspace of the space of all functions defined on the sphere.

A representation of k as a harmonic series can then be derived. In short, since k is rotationally symmetric about the pole, under an appropriate choice of a coordinate frame its energy concentrates exclusively in the zonal harmonics (the harmonics with $m=0$), while the coefficients of all the harmonics with $m \neq 0$ vanish. Thus, k can be expressed as:

$$k = \sum_{n=0}^{\infty} k_n h_{n0}. \quad (7)$$

The Lambertian kernel is given by $k(\theta)=\max(\cos\theta, 0)$, where $\theta$ denotes the solid angle between the light direction and the surface normal. The harmonic transform of k is defined as $$k = \sum_{n=0}^{\infty} \sum_{m=-n}^{n} k_{nm} h_{nm},$$

where the coefficients $a_{nm}$ are given by $$k_{nm} = \int_0^{2\pi} \int_0^\pi \max(\cos\theta, 0) h_{nm}(\theta, \phi) \sin\theta\, d\theta\, d\phi.$$

WLOG, the coordinate system on the sphere is set as follows. One of the poles is positioned at the center of k, $\theta$ then represents the angle along a longitude and varies from 0 to $\pi$, and $\phi$ represents an angle along a latitude and varies from 0 to $2\pi$. In this coordinate system k is independent of $\phi$ and is rotationally symmetric about the pole. Consequently, all its energy is split between the zonal harmonics (the harmonics with $m=0$), and the coefficients for every $m \neq 0$ vanish.

An explicit form for the coefficients is then determined. First, one can limit the integration to the positive portion of the cosine function by integrating over $\theta$ only to $\pi/2$, that is, $$k_{nm} = \int_0^{2\pi} \int_0^{\frac{\pi}{2}} \cos\theta\, h_{nm}(\theta, \phi) \sin\theta\, d\theta\, d\phi.$$

Next, since only the $m=0$ components do not vanish, denote $k_n = k_{n0}$, then $$k_n = \int_0^{2\pi} \int_0^{\frac{\pi}{2}} \cos\theta\, h_{n0}(\theta) \sin\theta\, d\theta\, d\phi = 2\pi \int_0^{\frac{\pi}{2}} \cos\theta\, h_{n0}(\theta) \sin\theta\, d\theta.$$

Now, $$h_{n0} = \sqrt{\frac{2n+1}{4\pi}} P_n(\cos\theta),$$

where $P_n(z)$ is the associated Legendre function of order n defined by $$P_n(z) = \frac{1}{2^n n!} \frac{d^n}{dz^n}(z^2-1)^n.$$

Substituting $z = \cos\theta$ one obtains $$k_n = \sqrt{(2n+1)\pi} \int_0^1 z P_n(z) dz.$$

Now turning to computing the integral $$\int_0^1 z P_n(z) dz.$$

This integral is equal to $$\frac{1}{2^n n!} \int_0^1 z \frac{d^n}{dz^n}(z^2-1)^n dz.$$

Integrating by parts yields $$\frac{1}{2^n n!} \left[ z \frac{d^{n-1}}{dz^{n-1}}(z^2-1)^n \Big|_0^1 - \int_0^1 \frac{d^{n-1}}{dz^{n-1}}(z^2-1)^n dz \right].$$

The first term vanishes and one is left with $$-\frac{1}{2^n n!} \int_0^1 \frac{d^{n-1}}{dz^{n-1}}(z^2-1)^n dz = -\frac{1}{2^n n!} \frac{d^{n-1-1}}{dz}(z^2-1)^n \Big|_0^1.$$

This formula vanishes for $z=1$ and so one obtains $$\frac{1}{2^n n!} \frac{d^{n-2}}{dz^{n-1}}(z^2-1)^n \Big|_{z=0}.$$

Now, $(z^2-1)^n = \sum_{k=0}^{n} \binom{n}{k}(-1)^{n-k} z^{2k}.$

When the n−2 derivative is taken, all terms whose exponent is less than n−2 disappear. Moreover, since the derivative at z=0 is evaluated, all the terms whose exponent is larger than n−2 vanish. Thus, only the term whose exponent is 2k=n−2 survives. Denote the n−2 coefficient by $b_{n-2}$, then, when n is odd $b_{n-2}=0$, and when n is even $$b_{n-2} = \binom{n}{\frac{n}{2}-1}(-1)^{\frac{n}{2}+1}.$$

In this case $$\frac{d^{n-2}}{dz^{n-2}}(z^2-1)^n \Big|_{z=0} = (n-2)! b_{n-2} = (n-2)! \binom{n}{\frac{n}{2}-1}(-1)^{\frac{n}{2}+1},$$

and one obtains $$\int_0^1 z P_n(z) dz = \frac{(-1)^{\frac{n}{2}+1}(n-2)!}{2^n n!} \binom{n}{\frac{n}{2}-1} = \frac{(-1)^{\frac{n}{2}+1}(n-2)!}{2^n \left(\frac{n}{2}-1\right)!\left(\frac{n}{2}+1\right)!}.$$

The above derivation holds for n>2. The special cases that n=0 and n=1 should be handled separately. In the first case $P_0(z)=1$ and in the second case $P_1(z)$. For n=0 the integral becomes $$\int_0^1 z\, dz = \frac{1}{2}, \int_0^1 z^2\, dz = \frac{1}{3}.$$

and for n=1 it becomes $\int_0^1 z^2 dz = \frac{1}{3}.$

Consequently, $$k_n = \sqrt{(2n+1)\pi} \int_0^1 z P_n(z) dz$$

$$= \begin{cases} \sqrt{\frac{\pi}{2}} & n=0 \\ \sqrt{\frac{\pi}{3}} & n=1 \\ \frac{(-1)^{\frac{n}{2}+1}(n-2)!\sqrt{(2n+1)\pi}}{2^n \left(\frac{n}{2}-1\right)!\left(\frac{n}{2}+1\right)!} & n \geq 2, \text{ even} \\ 0 & n \geq 2, \text{ odd} \end{cases}$$

After this tedious manipulation it is obtained that $$k_n = \begin{cases} \frac{\sqrt{\pi}}{2} & n=0 \\ \sqrt{\frac{\pi}{3}} & n=1 \\ \frac{(-1)^{\frac{n}{2}+1}(n-2)!\sqrt{(2n+1)\pi n}}{2^n \left(\frac{n}{2}-1\right)!\left(\frac{n}{2}+1\right)!} & n \geq 2, \text{ even} \\ 0 & n \geq 2, \text{ odd} \end{cases} \quad (8)$$

The first few coefficients, for example, are $$k_0 = \frac{\sqrt{\pi}}{2} \approx 0.8862 \quad k_1 = \sqrt{\frac{\pi}{3}} \approx 1.0233 \quad (9)$$

$$k_2 = \frac{\sqrt{5\pi}}{8} \approx 0.4954 \quad k_4 = -\frac{\sqrt{\pi}}{16} \approx -0.1108$$

$$k_6 = \frac{\sqrt{13\pi}}{128} \approx 0.0499 \quad k_8 = \frac{\sqrt{17\pi}}{256} \approx 0.0285.$$

($k_3 = k_5 = k_7 = 0$) A graph representation of the coefficients is shown in FIG. 1. FIG. 1 shows from left to right: a graph representation of the first 11 coefficients of the Lambertian kernel; the relative energy captured by each of the coefficients; the accumulated energy; and a zoom in to the accumulated energy.

The energy captured by every harmonic term is measured commonly by the square of its respective coefficient divided by the total squared energy of the transformed function. The total squared energy in the half cosine function is given by $$\int_0^{2\pi}\int_0^{\pi} k^2(\theta)\sin\theta d\theta d\phi = 2\pi\int_0^{\frac{\pi}{2}}\cos^2\theta\sin\theta d\theta = 2\pi\int_0^1 z^2 dz = \frac{2\pi}{3}. \quad (10)$$

Table 1 shows the relative energy captured by each of the first several coefficients. The top row of Table 1 shows the energy captured by the n'th zonal harmonic for the Lambertian kernel ($0 \leq n \leq 8$). The middle row of Table 1 shows the energy accumulated up to the order n. This energy represents the quality of the n'th order approximation of $r(\theta, \phi)$ (measured in relative squared error). The bottom row shows a lower bound on the quality of this approximation due to the non-negativity of the light. The n=3, 5, and 7 are omitted because they contribute no energy. The relative energies shown in Table 1 are given in percents. It can be seen that the kernel is dominated by the first three coefficients. Thus, a second order approximation already accounts for 99.22% of the energy. With this approximation the half cosine function can be written as:

$$k(\theta) = \max(\cos\theta, 0) \approx \frac{\sqrt{\pi}}{2}h_{00} + \sqrt{\frac{\pi}{3}}h_{10} + \sqrt{\frac{5\pi}{g}}h_{20} = \quad (11)$$

$$\frac{1}{4} + \frac{1}{2}\cos\theta + \frac{5}{16}\cos 2\theta.$$

Figure 2:
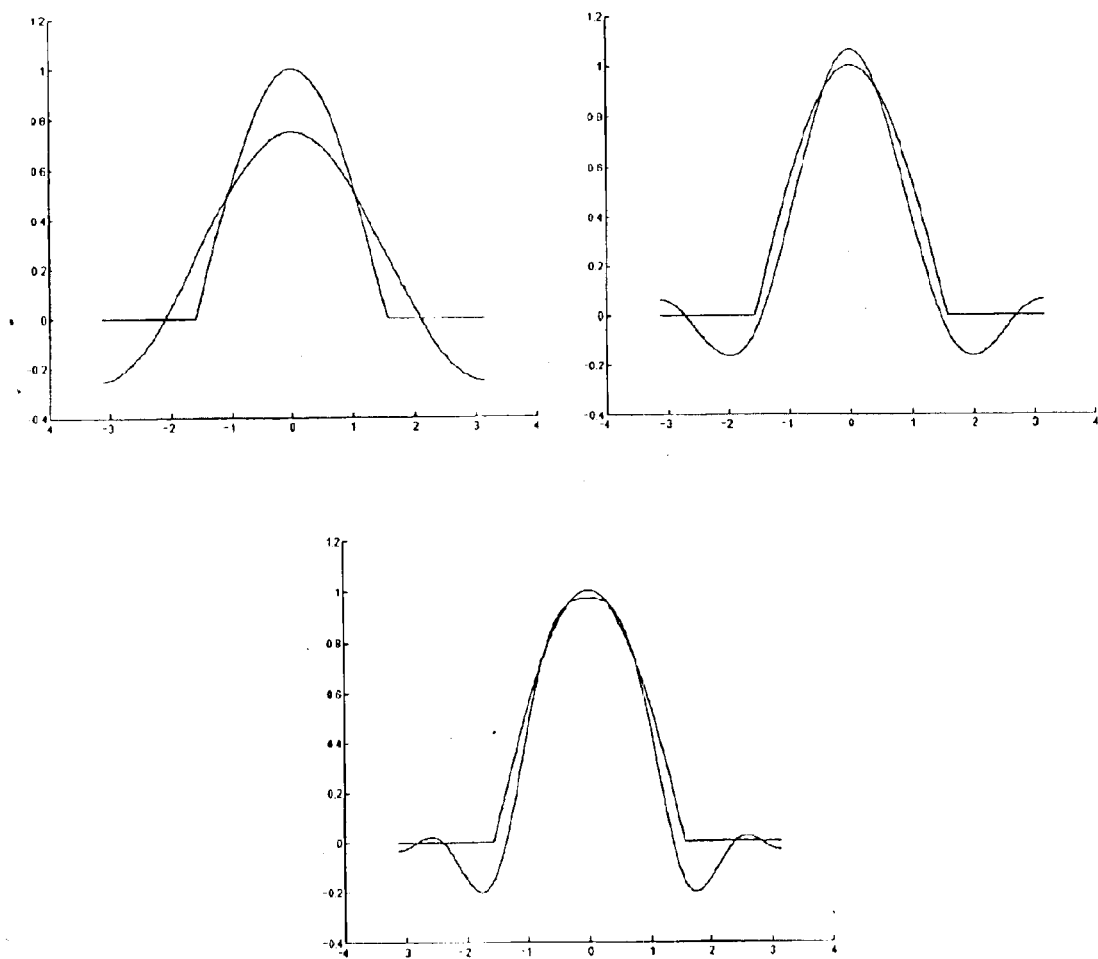
FIG. 2 illustrates a 1D slice of the Lambertian kernel and its various approximations.

The quality of the approximation improves somewhat with the addition of the fourth order term (99.81%) and deteriorates to 87.5% when a first order approximation is used. FIG. 2 shows a 1D slice of the Lambertian kernel and its approximations of first, second, and third order, respectively, from left to right.

TABLE 1

| n | 0 | 1 | 2 | 4 | 6 | 8 |
|---|---|---|---|---|---|---|
| Energy | 37.5 | 50 | 11.72 | 0.59 | 0.12 | 0.04 |
| Accumulated energy | 37.5 | 87.5 | 99.22 | 99.81 | 99.93 | 99.97 |
| Lower bound | 37.5 | 75 | 97.96 | 99.48 | 99.80 | 99.90 |

Linear Approximations of the Reflectance Function

The fact that the Lambertian kernel has most of its energy concentrated in the low order terms implies that the set of reflectance functions of a sphere of unit albedo can be well approximated by a low dimensional linear space. This space is spanned by a small set of what are called harmonic reflectances. The harmonic reflectance $r_{nm}(\theta, \phi)$ denotes the reflectance of the sphere when it is illuminated by the harmonic "light" $h_{nm}$. Note that harmonic lights generally are not positive everywhere, so they do not correspond to real, physical lighting conditions; they are abstractions. As is explained below every reflectance function $r(\theta, \phi)$ will be approximated to an excellent accuracy by a linear combination of a small number of harmonic reflectances.

To evaluate the quality of the approximation consider first, as an example, lighting generated by a point source at the z direction ($\theta=\phi=0$). A point source is a delta function. The reflectance of a sphere illuminated by a point source is obtained by a convolution of the delta function with the kernel, which results in the kernel itself. Due to the linearity of the convolution, if the reflectance due to this point source is approximated by a linear combination of the first three zonal harmonics, $r_{00}$, $r_{10}$, and $r_{20}$, 99.22% of the energy is accounted for $$\min_{(a_0, a_1, a_2)} \frac{\|a_0 r_{00} + a_1 r_{10} + a_2 r_{20} - k\|^2}{\|k\|^2} = 0.9922,$$

where k, the Lambertian kernel, is the reflectance of the sphere when it is illuminated by a point source at the z direction. Similarly, first and fourth order approximations yield respectively 87.5% and 99.81% accuracy.

If the sphere is illuminated by a single point source in a direction other than the z direction the reflectance obtained would be identical to the kernel, but shifted in phase. Shifting the phase of a function distributes its energy between the harmonics of the same order n (varying m), but the overall energy in each n is maintained. The quality of the approximation, therefore, remains the same, but now for an N'th order approximation is needed to use all the harmonics with $n \leq N$ for all m. Recall that there are $2n+1$ harmonics in every order n. Consequently, a first order approximation requires four harmonics. A second order approximation adds five more harmonics yielding a 9D space. The third order harmonics are eliminated by the kernel, and so they do not need to be included. Finally, a fourth order approximation adds nine more harmonics yielding an 18D space.

It has been seen that the energy captured by the first few coefficients $k_i (1 \leq i \leq N)$ directly indicates the accuracy of the approximation of the reflectance function when the light includes a single point source. Other light configurations may lead to different accuracy. Better approximations are obtained when the light includes enhanced diffuse components of low-frequency. Worse approximations are anticipated if the light includes mainly high frequency patterns.

It turns out, however, that even if the light includes mostly high frequency patterns the accuracy of the approximation is still very high. This is a consequence of the non-negativity of light. A lower bound on the accuracy of the approximation for any light function can be derived as follows. It is simple to show that for any non-negative function the amplitude of the DC component must be at least as high as the amplitude of any of the other components. One way to see this is by representing such a function as a non-negative sum of delta functions. In such a sum the amplitude of the DC component is the weighted sum of the amplitudes of all the DC components of the different delta functions. The amplitude of any other frequency may at most reach the same level, but often will be lower due to interference. Consequently, in an N'th order approximation the worst scenario is obtained when the amplitudes in all frequencies higher than N saturate to the same amplitude as the DC component, while the amplitude of orders $1 \leq n \leq N$ are set to zero. In this case the relative squared energy becomes $$\frac{k_0^2}{k_0^2 + \sum_n^{\infty} = N + 1 k_n^2} = \frac{k_0^2}{\frac{2\pi}{3} - \sum_{n=1}^{N} k_n^2}. \quad (13)$$

Table 1 shows the bound obtained for several different approximations. It can be seen that using a second order approximation (involving nine harmonics) the accuracy of the approximation for any light function exceeds 97.96%. With a fourth order approximation (involving 18 harmonics) the accuracy exceeds 99.48%%. Note that the bound computed in Equation 13 is not tight, since the case that all the higher order terms are saturated may (and in fact in general will) yield a function with some negative values.

Consequently, the worst case accuracy may even be higher than the bound.

Generating Harmonic Reflectances

Constructing a basis to the space that approximates the reflectance functions is straightforward and can be done analytically. To construct the basis the Funk-Hecke theorem is invoked. Recall that this space is spanned by the harmonic reflectances, i.e., the reflectances obtained when a unit albedo sphere is illuminated by harmonic lights. These reflectances are the result of convolving the half cosine kernel with single harmonics. Due to the orthonormality of the spherical harmonics such a convolution cannot produce energy in any of the other harmonics. Consequently, denote the harmonic light by $h_{nm}$, then the reflectance due to this harmonic is the same harmonic, but scaled. Formally, $$r_{nm} = k \times h_{nm} = c_n h_{nm}. \tag{14}$$

It can be readily verified that the harmonics of the same order n but different phase m share the same scale factor $C_n$. It is therefore left to determine $c_n$.

To determine $c_n$ the fact that the half-cosine kernel k is an image obtained when the light is a delta function centered in the z direction is used. The transform of the delta function is given by $$\delta = \sum_{n=0}^{\infty} \sqrt{\frac{2n+1}{4\pi}} h_{n0} \text{ and the image it produces is} \tag{15}$$

$$k = \sum_{n=0}^{\infty} k_n h_{n0}, \tag{16}$$

where the coefficients $k_n$ are given in Equation 8. $c_n$ determines by how much the harmonic is scaled following the convolution; therefore, it is the ratio between k, and the respective coefficient of the delta function, that is, $$c_n = \sqrt{\frac{4\pi}{2n+1}} k_n. \tag{17}$$

The first few harmonic reflectances are given by $$r_{00} = \pi h_{00} \quad r_{2m} = \frac{\pi}{4} h_{2m} \quad r_{6m} = \frac{\pi}{64} h_{6m} \tag{18}$$

$$r_{1m} = \frac{2\pi}{3} h_{1m} \quad r_{4m} = \frac{\pi}{24} h_{4m} \quad r_{8m} = \frac{\pi}{128} h_{8m}$$

for $-n \leq m \leq n$ (and $r_{3m} = r_{5m} = r_{7m} = 0$).

For the construction of the harmonic reflectances it is useful to express the harmonics using space coordinates (x, y, z) rather than angles ($\theta$, $\phi$). This can be done by substituting the following equations for the angles:

$$\theta = \cos^{-1} z \tag{19}$$

$$\phi = \tan^{-1} \frac{y}{x}.$$

The first nine harmonics then become $$h_{00} = \frac{1}{\sqrt{4\pi}} \quad h_{11}^o = \sqrt{\frac{3}{4\pi}} y \quad h_{21}^o = 3\sqrt{\frac{5}{12\pi}} yz \tag{20}$$

$$h_{10} = \sqrt{\frac{3}{4\pi}} z \quad h_{20} = \frac{1}{2}\sqrt{\frac{5}{4\pi}} (2z^2 - x^2 - y^2) \quad h_{22}^e = \frac{3}{2}\sqrt{\frac{5}{12\pi}} (x^2 - y^2)$$

$$h_{11}^e = \sqrt{\frac{3}{4\pi}} x \quad h_{21}^e = 3\sqrt{\frac{5}{12\pi}} xz \quad h_{22}^o = 3\sqrt{\frac{5}{12\pi}} xy,$$

where the superscripts e and o denote the even and the odd components of the harmonics respectively ($h_{nm} = h_{n|m|}^e \pm ih_{n|m|}^o$, according to the sign of m; in fact the even and odd versions of the harmonics are more convenient to use in practice since the reflectance function is real). Notice that the harmonics are simply polynomials in these space coordinates. As discussed below, $h_{nm}$ ($\theta\phi$) and $h_{nm}$ (x, y, z) are invariably used to denote the harmonics expressed in angular and space coordinates respectively.

From Reflectances to Images

Up to this point the reflectance functions obtained by illuminating a unit albedo sphere by arbitrary light have been analyzed. The objective of the present invention is to use this analysis to efficiently represent the set of images of objects seen under varying illumination. An image of an object under certain illumination conditions can be constructed from the respective reflectance function in a simple way: each point of the object inherits its intensity from the point on the sphere whose normal is the same. This intensity is further scaled by its albedo. In other words, given a reflectance function r (x, y, z), the image of a point p with surface normal $n=(n_x, n_y, n_z)$ and albedo x is given by $$I(p) = \lambda r(n_x, n_y, n_z). \tag{21}$$

How the accuracy of this low dimensional linear approximation to a model's images can be affected by the mapping from the reflectance function to images will now be discussed. Two points will be made. First, in the worst case, this can make this approximation arbitrarily bad. Second, in typical cases it will not make this approximation less accurate.

There are two components to turning a reflectance function into an image. One is that there is a rearrangement in the x, y position of points. That is, a particular surface normal appears in one location on the unit sphere, and may appear in a completely different location in the image. This rearrangement has no effect on this approximation. Images are represented in a linear subspace in which each coordinate represents the intensity of a pixel. The decision as to which pixel to represent with which coordinate is arbitrary, and changing this decision by rearranging the mapping from (x, y) to a surface normal merely reorders the coordinates of the space.

The second and more significant difference between images and reflectance functions is that occlusion, shape variation and albedo variations effect the extent to which each surface normal on the sphere helps determine the image. For example, occlusion ensures that half the surface normals on the sphere will be facing away from the camera, and will not produce any visible intensities. A discontinuous surface may not contain some surface normals, and a surface with planar patches will contain a single normal over an extended region. In between these extremes, the curvature at a point will determine the extent to which its surface normal contributes to the image. Albedo has a similar effect. If a point is black (zero albedo) its surface normal has no effect on the image. In terms of energy, darker pixels contribute less to the image than brighter pixels. Overall, these effects are captured by noticing that the extent to which the reflectance of each point on the unit sphere influences the image can range from zero to the entire image.

An example will be given to show that in the worst case this can make this approximation arbitrarily bad. First, one should notice that at any single point, a low-order harmonic approximation to a function can be arbitrarily bad (this can be related to the Gibbs phenomena in the Fourier domain). Consider the case of an object that is a sphere of constant albedo. If the light is coming from a direction opposite the viewing direction, it will not illuminate any visible pixels. The light can be shifted slightly, so that it illuminates just one pixel on the boundary of the object; by varying the intensity of the light this pixel can be given any desired intensity. A series of lights can do this for every pixel on the rim of the sphere. If there are n such pixels, the set of images gotten fully occupies the positive orthant of an n-dimensional space. Obviously, points in this space can be arbitrarily far from any 9D space. What is happening is that all the energy in the image is concentrated in those surface normals for which the approximation happens to be poor.

However, generally, things will not be so bad. In general, occlusion will render an arbitrary half of the normals on the unit sphere invisible. Albedo variations and curvature will emphasize some normals, and de-emphasize others. But in general, the normals whose reflectances are poorly approximated will not be emphasized more than any other reflectances, and the approximation of reflectances on the entire unit sphere is expected to be about as good over those pixels that produce the intensities visible in the image.

Therefore, it is assumed that the subspace results for the reflectance functions carry on to the images of objects. Thus the set of images of an object is approximated by a linear space spanned by what is called harmonic images, denoted $b_{nm}$. These are images of the object seen under harmonic light. These images are constructed as in Equation 21 as follows:

$$b_{nm}(p) = \lambda r_{nm}(n_x, n_y, n_z). \quad (22)$$

Figure 3:
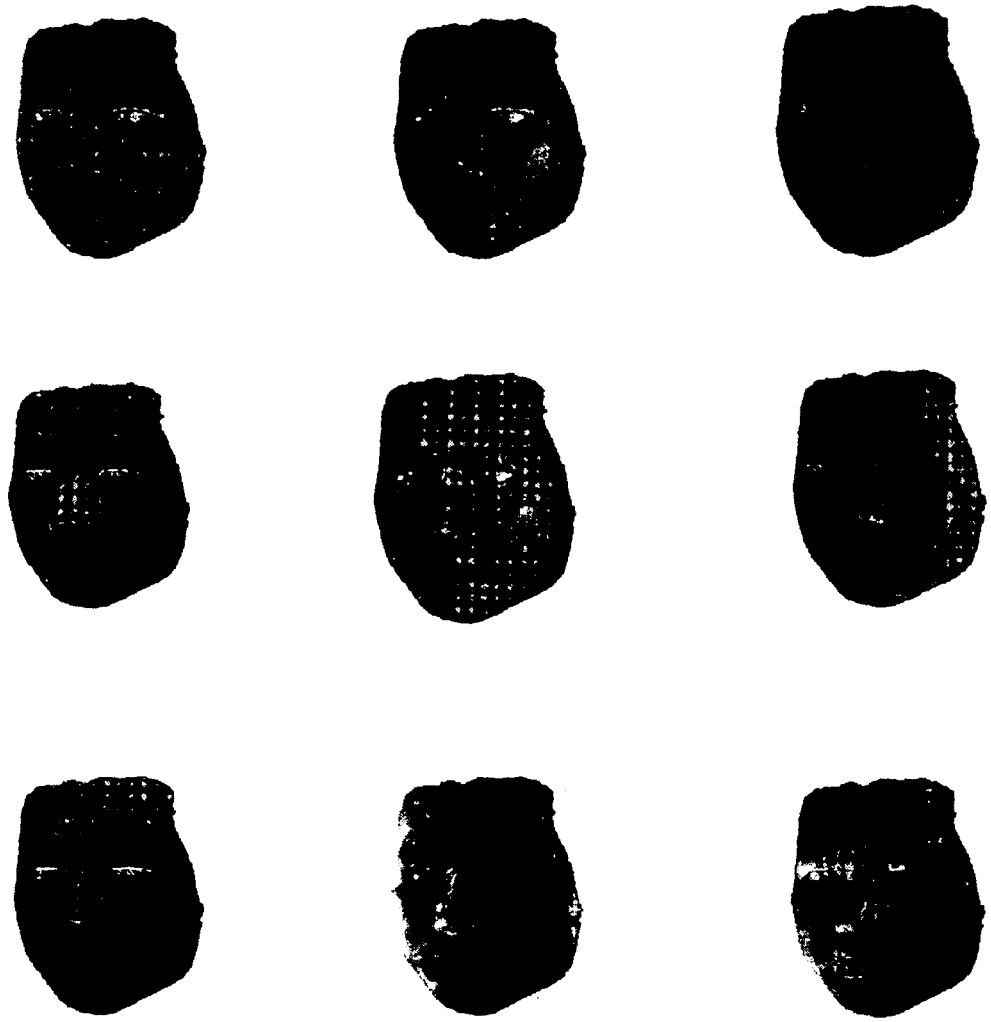
FIG. 3 illustrates the first nine harmonic images derived from a 3D model of a face.

Note that $b_{00}$ is an image obtained under constant, ambient light, and so it contains simply the surface albedo (up to a scaling factor). The first order harmonic images $b_{1m}$ are images obtained under cosine lighting centered at the three main axes. These images contain the three components of the surface normals scaled by the albedos. The higher order harmonic images contain polynomials of the surface normals scaled by the albedo. FIG. 3 shows the first nine harmonic images derived from a 3D model of a face. The top row contains the zero'th harmonic on the left and two of the first harmonic images. The second row, left, shows the third of the first harmonic images. The remaining images are images derived from the second harmonics.

Recognition

The present invention develops an analytic description of the linear subspace that lies near the set of images that an object can produce. It is then shown how to use this description to recognize objects. Although the method of the present invention is suitable for general objects, examples related to the problem of face recognition will be given by way of example only and not to limit the scope of the present invention. It is assumed that an image must be compared to a data base of models of 3D objects. It is also assumed that the pose of the object is already known, but that its identity and lighting conditions are not. For example, one may wish to identify a face that is known to be facing the camera. Or one may assume that either a human or an automatic system have identified features, such as the eyes and the tip of the nose, that allow us to determine pose for each face in the data base, but that the data base is too big to allow a human to select the best match.

Recognition proceeds by comparing a new image to each model in turn. To compare to a model the distance between the image and the nearest image that the model can produce is computed. Two classes of algorithms are presented that vary in their representation of a model's images. The linear subspace can be used directly for recognition, or one can be restricted to a subset of the linear subspace that corresponds to physically realizable lighting conditions.

The advantages gained by having an analytic description of the subspace available is stressed in the methods of the present invention, in contrast to previous methods in which PCA could be used to derive a subspace from a sample of an object's images. One advantage of an analytic description is that this provides an accurate representation of an object's images, not subject to the vagaries of a particular sample of images. A second advantage is efficiency; a description of this subspace can be produced much more rapidly than PCA would allow. The importance of this advantage will depend on the type of recognition problem that is tackled. In particular, one is generally interested in recognition problems in which the position of an object is not known in advance, but can be computed at run-time using feature correspondences. In this case, the linear subspace must also be computed at run-time, and the cost of doing this is important. How this computation may become part of the inner loop of a model-building algorithm is discussed below, where efficiency will also be crucial. Finally, it will be shown that when a 4D linear subspace is used, the constraint that the lighting be physically realizable can be incorporated in an especially simple and efficient way.

Linear methods

The most straightforward way to use the prior results for recognition is to compare a novel image to the linear subspace of images that correspond to a model. To do this, the harmonic basis images of each model are produced. Given an image I a vector a is sought that minimizes $\|Ba-I\|$, where B denotes the basis images, B is p×r, p is the number of points in the image, and r is the number of basis images used. As discussed above, nine is a natural value to use for r, but r=4 provides greater efficiency while r=18 offers even better potential accuracy. Every column of B contains one harmonic image $b_{nm}$. These images form a basis for the linear subspace, though not an orthonormal one. A QR decomposition is applied to B to obtain such a basis, Q. The distance from the image, I, and the space spanned by B as $\|QQ^T I - I\|$ can then be computed. The cost of the QR decomposition is $O(pr^2)$, assuming p >>r.

In contrast to this, prior methods have sometimes performed PCA on a sample of images to find a linear subspace representing an object. For example, Georghides renders the images of an object and finds an 11D subspace that approximates these images. When s sampled images are used (typically s>>r), with s<<p PCA requires $O(ps^2)$. Also, in MATLAB, PCA of a thin, rectangular matrix seems to take exactly twice as long as its QR decomposition. Therefore, in practice, PCA on the matrix constructed by the methods of Georghides would take about 150 times as long as using the method of the present invention to build a 9D linear approximation to a model's images. This may not be too significant if pose is known ahead of time and this computation takes place off line. But when pose is computed at run time, the advantages of the methods of the present invention can become very great.

It is also interesting to compare the methods of the present invention to another linear method, due to A. Shashua. "On Photometric Issues in 3D Visual Recognition from a Single 2D Image", Int. J. of Comp. Vis., 21(1–2): 99–122, 1997. (hereinafter "Shashua"). Shashua points out that in the absence of attached shadows, every possible image of an object is a linear combination of the x, y and z components of the surface normals, scaled by the albedo. Shashua therefore proposes using these three components to produce a 3D linear subspace to represent a model's images. Notice that these three vectors are identical, up to a scale factor, to the basis images produced by the first harmonic in the methods of the present invention.

While this equivalence is clear algebraically, it can also be explained as follows. The first order harmonic images are images of any object subjected to a lighting condition described by a single harmonic. The Funk-Hecke theorem ensures that all components of the kernel describing the reflectance function will be irrelevant to this image except for the first order components. In Shashua's work, the basis images are generated by using a point source as the lighting function, which contains all harmonics. But the kernel used is a full cosine function of the angle between the light and the surface normal. This kernel has components only in the first harmonic. So all other components of the lighting are irrelevant to the image. In either case, the basis images are due only to the first set of harmonics.

Enforcing Positive Light

When one takes arbitrary linear combinations of the harmonic basis images, one may obtain images that are not physically realizable. This is because the corresponding linear combination of the harmonics representing lighting may contain negative values. That is, rendering these images may require negative "light", which of course is physically impossible. It is now shown how to use the basis images while enforcing the constraint of non-negative light. There are those in the art who have shown that the set of images of an object produced by non-negative lighting is a convex cone in the space of all possible images. As discussed above, this is referred to as the illumination cone. It is also shown how to compute approximations to this cone in the space spanned by the harmonic basis images.

Specifically, given an image I it is attempted to minimize $\|Ba-I\|$ subject to the constraint that the light is non-negative everywhere along the sphere. A straightforward method to enforce positive light is to infer the light from the images by inverting the convolution. This would yield linear constraints in the components of a, $Ha \leq 0$, where the columns of H contain the spherical harmonics $h_{nm}$. Unfortunately, this naive method is problematic since the light may contain higher order terms which cannot be recovered from a low order approximation of the images of the object. In addition, the harmonic approximation of non-negative light may at times include negative values. Forcing these values to be non-negative will lead to an incorrect recovery of the light. As discussed below, a different method is discussed in which the illumination cone is projected onto the low dimensional space and use this projection to enforce non-negative lighting.

A method that can use any number of harmonic basis images is first presented. A non-negative lighting function can be written as a non-negative combination of delta functions, each representing a point source. Denote by $\delta_{\theta\phi}$ the function returning 1 at $(\theta, \phi)$ and 0 elsewhere. This lighting function represents a point source at direction $(\theta, \phi)$. To project the delta function onto the first few harmonics one needs to look at the harmonic transform of the delta function. Since the inner product of $\delta_{\theta\phi}$ with a function $f$ returns simply $f(\theta, \phi)$, one can conclude that the harmonic transform of the delta function is given by $$\delta_{\theta\phi} = \sum_{n=0}^{\infty} \sum_{m=-n}^{n} h_{nm}(\theta, \phi) h_{nm}. \tag{23}$$

The projection of the delta function onto the first few harmonics, therefore, is obtained by taking the sum only over the first few terms.

Suppose now that a non-negative lighting function Q ($\emptyset$, $\emptyset$) is expressed as a non-negative combination of delta functions $$l = \sum_{j=1}^{s} a_j \delta_{\theta_j \phi_j}, \tag{24}$$

for some s. Obviously, due to the linearity of the harmonic transform, the transform of l is a non-negative combination of the transforms of the delta functions with the same coefficients. That is, $$l = \sum_{j=1}^{s} a_j \sum_{n=0}^{\infty} \sum_{m=-n}^{n} h_{nm}(\theta_j, \phi_j) h_{nm}. \tag{25}$$

Likewise, the image of an object illuminated by Q can be expressed as a non-negative combination as follows $$I = \sum_{j=1}^{s} a_j \sum_{n=0}^{\infty} \sum_{m=-n}^{n} h_{nm}(\theta_j, \phi_j) b_{nm}, \tag{26}$$

where $b_{nm}=k_n h_{nm}$ (see previous section).

Given an image, an objective of the present invention is to recover the non-negative coefficients $a_j$. Assume an approximation of order N, and denote the number of harmonics required for spanning the space by r=r(N) (e.g., if N=2 then r=9). In matrix notation, the harmonic functions are denoted by H, H is s×r, where s is the number of sample points on the sphere. The columns of H contain a sampling of the harmonic functions, while its rows contain the transform of the delta functions. Further, B is denoted by the basis images, B is p×r, where p is the number of points in the image. Every column of B contains one harmonic image $b_{nm}$. Finally, denote $a^T=(a_1, \ldots, a_s)$. Then, the objective is to solve the non-negative least squares problem:

$$\min_{a} \|BH^T a - I\| \text{ s.t. } a \geq 0. \tag{27}$$

One can further project the image to the r-dimensional space spanned by the harmonic images and solve the optimization problem in this smaller space. To do so a QR decomposition is applied to B, so that B=QR, where Q is unitary and R is upper triangular. Keeping only r columns for Q, and multiplying the optimization function by QT from the left $$\min_{a} \|RH^T a - Q^T l\| \text{ s.t. } a \geq 0. \tag{28}$$

Now R is r×r and $Q^T 1$ is a r-vector.

Note that this method is similar to that presented in Georghides et al. The primary difference is that a low dimensional space constructed for each model using its harmonic basis images is worked in. Georghides et al. performs a similar computation after projecting all images into a 100-dimensional space constructed using PCA on images rendered from models in a ten-model data base. The methods of the present invention are inspired by the work of those in the art, but it is felt that it improves upon it by working in a space that can be analytically and efficiently constructed. Moreover, it is known that this space provides an accurate representation of a model's images.

Recognition with Four Harmonics

A further simplification can be obtained if the set of images of an object is approximated only up to first order. Four harmonics are required in this case. One is the DC component, representing the appearance of the object under uniform ambient light, and three are the basis images also used by Shashua. Again, $\|Ba-I\|$ (now B is p×4) is attempted to be minimized subject to the constraint that the light is non-negative everywhere along the sphere.

As before, the constraints are determined by projecting the delta functions onto the space spanned by the first four harmonics. However, now this projection takes a particularly simple form. Consider a delta function $\delta_{\theta\phi}$. Its first order approximation is given by $$\delta_{\theta\phi} \approx \sum_{n=0}^{1} \sum_{m=-n}^{n} h_{nm}(\theta, \phi) h_{nm}. \tag{29}$$

Using space coordinates this approximation $$\delta_{\theta\phi} = \frac{1}{4\pi} + \frac{3}{4\pi}(x\sin\theta\cos\phi + y\sin\theta\sin\phi + z\cos\theta). \tag{30}$$

Let $$l \approx a_0 + a_1 x + a_2 y + a_3 z \tag{31}$$

be the first order approximation of a non-negative lighting function l. l is a non-negative combination of delta functions. It can be readily verified that such a combination cannot decrease the zero order coefficient relative to the first order ones. Consequently, any non-negative combination of delta functions must satisfy $$9a_0^2 \geq a_1^2 a_2^2 + a_3^2. \tag{32}$$

(Equality is obtained when the light is a delta function, see Equation 30.) Therefore, one can express the problem of recognizing an object with a 4D harmonic space as minimizing $\|Ba-I\|$ subject to Equation 32.

In the four harmonic case the harmonic images are just the albedos and the components of the surface normals scaled by the albedos, each scaled by some factor. It is therefore natural to use those directly and hide the scaling coefficients within the constraints. Let I be an image of the object illuminated by Q, then, using Equations 18 and 22, $$I \approx \pi a_0 \lambda - \frac{2\pi}{3}(a_1 \lambda n_x + a_2 \lambda n_y + a_3 \lambda n_z). \tag{33}$$

where $\lambda$ and $(n_x, n_y, n_x)$ are respectively the albedo and the surface normal of an object point. Using the unscaled basis images, $\lambda$, $\lambda n_x$, $\lambda n_y$, and $\lambda n_z$, this equation can be written as:

$$I \approx b_0 \lambda + b_1 \lambda n_x + b_2 \lambda n_y + b_3 \lambda n_z, \tag{34}$$

with $b_0 = \pi a_0$ and $b_i = \frac{2\pi}{3} a_i (1 \leq i \leq 3)$. Substituting for the $a_i$'s one obtains $$\frac{9b_0^2}{\pi^2} \geq \frac{9}{4\pi^2}(b_1^2 + b_2^2 + b_3^2), \tag{35}$$

which simplifies to $$4b_0^2 \geq b_1^2 b_2^2 + b_3^2. \tag{36}$$

Consequently, to solve the 4D case the difference between the two sides of Equation 34 are minimized subject to Equation 36.

It is now shown that finding the nearest image in the space spanned by the first four harmonic images with non-negative light can be transformed to a six degree polynomial with a single variable, the Lagrange multiplier. With this polynomial solving the minimization problem becomes straightforward.

Finding the nearest image in the 4D harmonic space subject to the constraint that the light is non-negative has the general form $$\min \|Ax - b\| \text{ s.t. } x^r Bx = 0,$$

with A (n×4), b (n×1) resides in the column space of A and B (4×4). In this representation the columns of A contain the harmonic images, b is the image to be recognized, and B=diag (4, −1, 1, −1). However, those skilled in the art will recognize that the methods of the present invention can also be used with an arbitrary nonsingular matrix B.

First, one can solve the linear system min $$\min \|Ax - b\|$$

and check if this solution satisfies the constraint. If it does, one is done. If not, one must seek the minimum that occurs when the constraint is satisfied at equality. The solution is divided into two parts. In the first part the problem is converted to the form:

$$\min \|z - c\| \text{ s.t. } z^T Dz \geq 0,$$

As discussed below, the new problem can be turned into a sixth order polynomial.

Step 1:

Define b' such that Ab'=b (this is possible because b lies in the column space of A). Then, Ax−b=A(x−b'), implying that this problem is equivalent to:

$$\min \|A(x - b')\| \text{ s.t. } x^T Bx = 0.$$

Using the method presented in Golub and van Loan (see the second edition, pages 466–471, especially algorithm 8.7.1) $A^T A$ and B are simultaneously diagnolized. This will produce a non-singular matrix X such that $X^T A^T A X = I$ and $X^T B X = D$, I denotes the identity matrix, and D is a 4×4 diagonal matrix. Thus, one obtains $$\min\|X^{-1}(x-b^1)\| \text{ s.t. } x^Tx^TX^{-T}DX^{-1}x=0.$$

where $X^1$ denotes the inverse of X and XT denotes its transpose. Denote $z=X^1 x$ and $c=X^1b'$, then one obtains min $$\min\|z-c\| \text{ s.t. } z^TDz=0.$$

This has the requested form.

Step 2:

At this point the present invention attempts to solve a problem of the form $$\min\|z-c\| \text{ s.t. } z^TDz=0$$

This minimization problem is solved using Lagrange multipliers. That is, $$\min\|z-c\|+\lambda z^TDz=0.$$

Taking the derivatives with respect to x and λ one gets $$z-c+\lambda Dz=0,$$

and $$z^TDz=0.$$

From the first equation one gets $$z=(I+\lambda D)^{-1}c.$$

Since D is diagonal the components of z are given by $$z_i = \frac{c_i}{1+\lambda d_i}.$$

The constraint $z^TDz=0$ thus becomes $$\sum_{i=1}^{n} \frac{c_i^2 d_i}{(1+\lambda d_i)^2} = 0,$$

which, after multiplying out the denominator, becomes a sixth degree polynomial in λ. This polynomial can be efficiently and accurately solved using standard techniques (the MATLAB function roots is used). All solutions are plugged in to determine x, as indicated above, and choose the real solution that minimizes the optimization criteria.

Experiments

Figure 4:
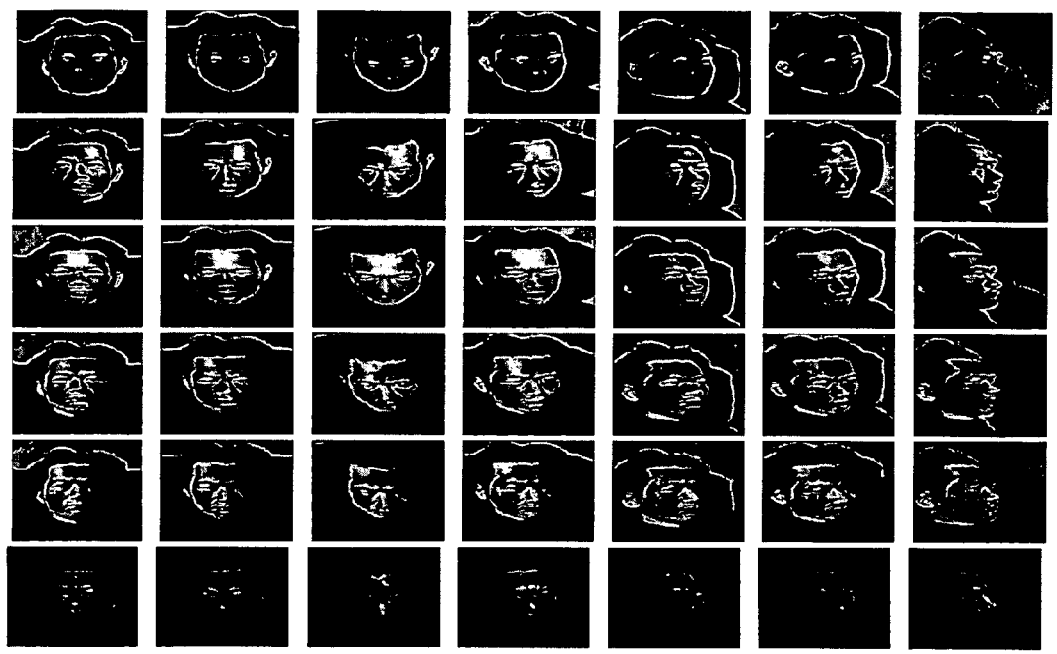
FIG. 4 illustrates test images used in the experiments of the methods of the present invention.

Experiments have been performed with the recognition methods of the present invention, using a subset of a data base of faces. This subset contains 3D models of ten faces, including models of their albedos in the red, green and blue color channels. As test images, 42 images of a single individual are used, taken across seven different poses and six different lighting conditions (shown in FIG. 4). In these experiments, each image is compared to each model, and the rank of the correct answer is determined (i.e., a rank of one means the correct answer was chosen first). This subset of the data base is too small to allow us to draw any definite conclusions from the experiments. Rather, it is small enough to allow us to compare a number of different methods, some of which are too slow to run on a large data set.

In implementing all the methods, one must first obtain a 3D alignment between model and the image (referred to as "positioning"). This can be done with existing methods known in the art, such as with the method disclosed in co-pending U.S. patent application, Ser. No. 09/538,209, which is incorporated herein by its reference. In brief, features on the faces can be identified by hand, and then a 3D rigid transformation can be found to align the 3D features with the corresponding 2D image features. For instance, suppose the 3D models are models of many people's faces. Prior to recognition, a person can click on points on the face, indicating the location of features like the center of the eyes or the tip of the nose. When the input image arrives, a person can click on corresponding features in the input image. Given a match between the image features and the model features, for each model it can be determined the position of that object relative to the camera that best matches the model features to the input image features. Determining this positioning is a well-studied problem in the art, for which many solutions have been derived.

To determine lighting conditions, attention is only paid to image pixels that have been matched to some point in the 3D model of the face. Image pixels that are of maximum intensity are also ignored, since these may be saturated, and provide misleading values. Finally, both the model and the image are subsampled, replacing each m×m square with its average values. This is because some of the methods described below, especially Georghides', are too slow to run on full images. A slight variation of Georghides', method is implemented in order to avoid approximations. Each model is rendered using 100 different point sources. Then these 100 images are projected, along with the test image, into a 101D space, where non-negative least squares optimization is performed. This is equivalent to, but more efficient than performing the optimization in the full space. However, it still requires use of SVD on 101 images, which is too slow when performed on the entire images. In their experiments this Singular Value Decomposition (SVD) was performed off-line, but in these experiments, since pose is not known ahead of time, SVD must be performed for each pose, on-line. SVD is a standard method of decomposing a matrix that makes explicit its most important components. However, preliminary experiments indicate that the methods of the present invention subsample quite a bit without significantly reducing accuracy. In the experiments below, all algorithms subsampling are run with 16×16 squares. Some other algorithms have been run with less subsampling also.

Once lighting conditions were determined on the sub-sampled image, they were used to render the model in an image of full size. So, for example, the methods of the present invention produce coefficients that tell us how to linearly combine the harmonic images to produce the rendered image. These coefficients were computed on the sampled image, but then applied to harmonic images of the full, unsampled image. This process was repeated separately for each color channel. Then, a model was compared to the image by taking the root mean squared error, derived from the distance between the rendered face model and the portion of the image that it intersected.

TABLE 2

| Algorithm | Percent correct | Average rank |
| --- | --- | --- |
| Georghides et al. | 76 | 1.7 |
| Non-negative light 4 | 57 | 2.4 |
| Linear 9 | 86 | 1.2 |
| Non-negative light 9 | 79 | 1.2 |
| Linear 9 (sampling 8) | 88 | 1.1 |
| Linear 9 (sampling 4) | 88 | 1.1 |

The results of these experiments are shown in Table 2. In Table 2, "Georghides" indicates results finding lighting by matching the image to the non-negative combination of images generated with point sources. "Non-Negative light 4 and 9" indicate the methods of the present invention, using four and nine-dimensional harmonic basis images, along with a constraint that the lighting be positive. "Linear 9" indicates the linear method of the present invention using a 9D space. Table 2 also shows the results of applying "Linear 9" with smaller subsampling. "Percent correct" indicates what fraction of the images were matched to the right answer. Table 2 also shows an "Average rank", where a rank of k indicates that the right answer was picked k'th (i.e., rank of one means the correct answer was chosen). One can see that the methods of the present invention that use a 9D harmonic basis are more accurate than existing methods. The 4D harmonic may be less accurate, but it is much more efficient than the other methods.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for image recognition of an input image, the method comprising the steps of:

(a) receiving a three-dimensional model of a candidate object in a particular orientation;

(b) generating a set of harmonic images for the three-dimensional model, the harmonic images forming a basis for a linear subspace and approximating a reflectance on the candidate object when illuminated by a harmonic light; and (c) constructing a candidate image from the harmonic images that represents a point in the linear subspace that is closest to the input image by seeking a vector a that minimizes $\|Ba-I\|$ where B denotes the harmonic images and I is the input image.

2. The method of claim 1 wherein the candidate image constructed from the harmonic images is restricted to a subset of the linear subspace that corresponds to physically realizable lighting conditions.

3. The method of claim 1 wherein the linear subspace is spanned by a first four harmonic images.

4. The method of claim 1 wherein the linear subspace is spanned by a first nine harmonic images.

5. The method of claim 1 wherein the linear subspace is spanned by a first eighteen harmonic images.

6. The method of claim 1 wherein the candidate object is one of a plurality of candidate objects and wherein a candidate object with a three-dimensional model that generates a candidate image that is closest to the input image is selected.

* * * * *